US012568152B2

(12) United States Patent
Todd et al.

(10) Patent No.: US 12,568,152 B2
(45) Date of Patent: Mar. 3, 2026

(54) DATA CONFIDENCE FABRICS AND A SIDECAR PROXY

(71) Applicant: Dell Products L.P., Round Rock, TX (US)

(72) Inventors: Stephen J. Todd, North Andover, MA (US); Trevor Scott Conn, Leander, TX (US); Ahmed Khalid, Cork (IE); Mustafa Al-Bado, Cork (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/362,705

(22) Filed: Jul. 31, 2023

(65) Prior Publication Data

US 2025/0047758 A1 Feb. 6, 2025

Related U.S. Application Data

(60) Provisional application No. 63/477,250, filed on Dec. 27, 2022.

(51) Int. Cl.
| | |
|---|---|
| *H04L 67/561* | (2022.01) |
| *G06Q 30/04* | (2012.01) |
| *H04L 9/00* | (2022.01) |

(52) U.S. Cl.
CPC .......... *H04L 67/561* (2022.05); *G06Q 30/04* (2013.01); *H04L 9/50* (2022.05)

(58) Field of Classification Search
CPC ... H04L 67/561; H04L 9/0643; H04L 9/3263; H04L 9/50
See application file for complete search history.

(56) References Cited

U.S. PATENT DOCUMENTS

| | | |
|---|---|---|
| 7,302,641 B1 | 11/2007 | Yajima |
| 9,330,389 B2 | 5/2016 | Pitroda et al. |
| 10,135,607 B1 | 11/2018 | Roets |

(Continued)

FOREIGN PATENT DOCUMENTS

| | | |
|---|---|---|
| WO | 2018/126077 A1 | 7/2018 |
| WO | 2019/210409 A1 | 11/2019 |

(Continued)

OTHER PUBLICATIONS

Ahmed G. Gad et al. "Emerging Trends in Blockchain Technology and Applications: A Review and Outlook." (Oct. 2022). Retrieved online Apr. 2, 2025. https://www.sciencedirect.com/science/article/pii/S1319157822000891 (Year: 2022).

(Continued)

*Primary Examiner* — Philip C Lee
(74) *Attorney, Agent, or Firm* — Workman Nydegger

(57) ABSTRACT

A proxy or sidecar configured to connect an application to a data confidence fabric is discloses. The sidecar is configured to perform functions related to the transmission of data. As the sidecar intercepts communications to/from an associated application, the sidecar determines which of several functions to perform related to the transmission of data. In addition, the sidecar ensures that data confidence related operations and trust functions, as specified by the application, are applied to the data. Further, the sidecar identifies lineage when data is changed by an application.

9 Claims, 7 Drawing Sheets

(56) References Cited

U.S. PATENT DOCUMENTS

| | | | |
|---|---|---|---|
| 10,438,290 B1 | 10/2019 | Winklevoss et al. | |
| 10,581,805 B2 | 3/2020 | Simons et al. | |
| 10,601,665 B2 | 3/2020 | Bathen et al. | |
| 10,871,948 B1 | 12/2020 | Dowling | |
| 10,915,891 B1 | 2/2021 | Winklevoss et al. | |
| 11,108,891 B1 | 8/2021 | Todd et al. | |
| 11,153,280 B1* | 10/2021 | Walwadkar | H04L 63/166 |
| 11,188,977 B2 | 11/2021 | Youb et al. | |
| 11,200,569 B1 | 12/2021 | James et al. | |
| 11,308,487 B1 | 4/2022 | Foster et al. | |
| 11,334,883 B1 | 5/2022 | Auerbach et al. | |
| 11,533,381 B1* | 12/2022 | Hockey | H04L 67/564 |
| 11,562,333 B1 | 1/2023 | James et al. | |
| 11,716,312 B1* | 8/2023 | McNamara, Jr. | G06F 21/46 |
| | | | 726/6 |
| 11,792,084 B1* | 10/2023 | Foukas | G06N 3/10 |
| 11,961,070 B2 | 4/2024 | Sarin | |
| 11,971,862 B1 | 4/2024 | Han et al. | |
| 11,978,044 B2 | 5/2024 | Basu et al. | |
| 12,008,561 B2 | 6/2024 | Cona et al. | |
| 12,032,696 B2 | 7/2024 | Todd | |
| 12,045,879 B2 | 7/2024 | Rapowitz et al. | |
| 12,118,613 B2 | 10/2024 | Foote et al. | |
| 12,141,871 B1 | 11/2024 | James et al. | |
| 2009/0024660 A1 | 1/2009 | Borgsmidt et al. | |
| 2009/0028135 A1* | 1/2009 | Mantripragada | H04L 12/66 |
| | | | 370/352 |
| 2009/0144313 A1 | 6/2009 | Hodge et al. | |
| 2010/0082771 A1* | 4/2010 | Wood | G06F 15/16 |
| | | | 709/219 |
| 2010/0153835 A1 | 6/2010 | Xiong et al. | |
| 2011/0296510 A1 | 12/2011 | Hatlelid et al. | |
| 2015/0379510 A1 | 12/2015 | Smith | |
| 2016/0117668 A1 | 4/2016 | Pitroda et al. | |
| 2017/0132620 A1 | 5/2017 | Miller et al. | |
| 2018/0101906 A1 | 4/2018 | McDonald et al. | |
| 2018/0218343 A1 | 8/2018 | Kolb et al. | |
| 2018/0276626 A1 | 9/2018 | Laiben | |
| 2018/0287800 A1 | 10/2018 | Chapman et al. | |
| 2018/0329693 A1 | 11/2018 | Eksten et al. | |
| 2019/0019251 A1 | 1/2019 | Phillips, IV | |
| 2019/0116158 A1* | 4/2019 | Patil | H04L 63/123 |
| 2019/0238316 A1 | 8/2019 | Padmanabhan | |
| 2019/0260803 A1* | 8/2019 | Bykampadi | H04W 12/10 |
| 2019/0303942 A1 | 10/2019 | Balaraman et al. | |
| 2019/0333054 A1 | 10/2019 | Cona et al. | |
| 2019/0347406 A1* | 11/2019 | Lev-Ran | G06F 21/51 |
| 2019/0379642 A1 | 12/2019 | Simons et al. | |
| 2019/0385153 A1 | 12/2019 | Cui et al. | |
| 2019/0385154 A1 | 12/2019 | Cui et al. | |
| 2019/0386969 A1 | 12/2019 | Verzun et al. | |
| 2020/0007312 A1 | 1/2020 | Vouk et al. | |
| 2020/0027089 A1 | 1/2020 | Kuchar et al. | |
| 2020/0104819 A1 | 4/2020 | Garcia | |
| 2020/0112443 A1 | 4/2020 | Todd | |
| 2020/0120023 A1 | 4/2020 | Munson et al. | |
| 2020/0133955 A1 | 4/2020 | Padmanabhan et al. | |
| 2020/0236102 A1* | 7/2020 | Azulay | H04L 67/02 |
| 2020/0313856 A1 | 10/2020 | Basu et al. | |
| 2020/0344233 A1 | 10/2020 | Lai et al. | |
| 2021/0027404 A1 | 1/2021 | De Bold | |
| 2021/0082044 A1 | 3/2021 | Sliwka et al. | |
| 2021/0112117 A1 | 4/2021 | Munson et al. | |
| 2021/0124727 A1 | 4/2021 | Todd et al. | |
| 2021/0124728 A1 | 4/2021 | Todd et al. | |
| 2021/0126794 A1 | 4/2021 | Forrester et al. | |
| 2021/0164794 A1 | 6/2021 | Nagpal et al. | |
| 2021/0192520 A1 | 6/2021 | Patel et al. | |
| 2021/0209684 A1 | 7/2021 | Foote et al. | |
| 2021/0243167 A1 | 8/2021 | Todd et al. | |
| 2021/0243218 A1 | 8/2021 | Todd et al. | |
| 2021/0304065 A1 | 9/2021 | Todd et al. | |
| 2021/0328886 A1* | 10/2021 | Guim Bernat | H04L 41/0896 |
| 2021/0342803 A1 | 11/2021 | Yoo | |
| 2021/0365445 A1 | 11/2021 | Robell et al. | |
| 2021/0366586 A1 | 11/2021 | Ryan et al. | |
| 2021/0374730 A1 | 12/2021 | Todd et al. | |
| 2021/0385216 A1 | 12/2021 | Khalil et al. | |
| 2021/0405983 A1 | 12/2021 | Todd et al. | |
| 2021/0409436 A1 | 12/2021 | Todd et al. | |
| 2022/0021711 A1 | 1/2022 | Marsh et al. | |
| 2022/0038289 A1 | 2/2022 | Huang | |
| 2022/0084015 A1 | 3/2022 | Fawzy et al. | |
| 2022/0100858 A1 | 3/2022 | Todd | |
| 2022/0100879 A1 | 3/2022 | Todd et al. | |
| 2022/0116445 A1* | 4/2022 | Filippou | H04L 41/0853 |
| 2022/0129555 A1 | 4/2022 | Todd | |
| 2022/0138325 A1 | 5/2022 | Todd et al. | |
| 2022/0188800 A1 | 6/2022 | Sells et al. | |
| 2022/0210061 A1 | 6/2022 | Simu et al. | |
| 2022/0253842 A1 | 8/2022 | James et al. | |
| 2022/0261882 A1 | 8/2022 | Youb et al. | |
| 2022/0272127 A1* | 8/2022 | Yawalkar | H04L 63/1433 |
| 2022/0294690 A1 | 9/2022 | Nolan et al. | |
| 2022/0327529 A1 | 10/2022 | Williams et al. | |
| 2022/0351232 A1 | 11/2022 | Chan et al. | |
| 2023/0114684 A1 | 4/2023 | Jakobsson et al. | |
| 2023/0155984 A1* | 5/2023 | Adam | H04L 63/0281 |
| | | | 726/26 |
| 2023/0173395 A1 | 6/2023 | Cella et al. | |
| 2023/0196318 A1 | 6/2023 | Rosen et al. | |
| 2023/0230091 A1 | 7/2023 | Robert | |
| 2023/0237403 A1* | 7/2023 | Reineke | G06Q 10/06393 |
| | | | 706/46 |
| 2023/0237499 A1 | 7/2023 | Padmanabhan | |
| 2023/0334492 A1 | 10/2023 | Tai et al. | |
| 2023/0351393 A1 | 11/2023 | Cella et al. | |
| 2023/0362015 A1 | 11/2023 | Kayaba et al. | |
| 2024/0046318 A1 | 2/2024 | Muriqi | |
| 2024/0106839 A1* | 3/2024 | Smith | H04L 63/1441 |
| 2024/0152889 A1 | 5/2024 | Todd et al. | |
| 2024/0152911 A1 | 5/2024 | Rezaiean-Asel et al. | |
| 2024/0249277 A1 | 7/2024 | Hwang | |
| 2024/0256691 A1 | 8/2024 | Hwang | |
| 2024/0281799 A1 | 8/2024 | Ryan | |
| 2024/0289776 A1 | 8/2024 | Bimolaksono et al. | |
| 2024/0354735 A1 | 10/2024 | Kell et al. | |
| 2024/0354747 A1 | 10/2024 | Belostock et al. | |
| 2024/0364521 A1 | 10/2024 | Tang | |
| 2025/0088376 A1 | 3/2025 | Ren et al. | |

FOREIGN PATENT DOCUMENTS

| | | | |
|---|---|---|---|
| WO | 2020/124317 A1 | 6/2020 | |
| WO | WO-2021173716 A1* | 9/2021 | G06F 9/455 |

OTHER PUBLICATIONS

Choudhury et al. "Impact of Distributed Ledger Technology in Global Capital Markets." (May 16, 2023) Retrieved online Apr. 2, 2025. https://www.gfma.org/wp-content/uploads/2023/05/impact-of-dlt-on-global-capital-markets-full-report.pdf (Year: 2023).

John Kolb. "A Languge-Based Approach to Smart Contract Engineering." (Dec. 18, 2020). Retrieved online Apr. 2, 2025. https://www2.eecs.berkeley.edu/Pubs/TechRpts/2020/EECS-2020-220.pdf (Year: 2020).

Murphy et al., Towards trust-based data weighting in machine learning, 2023 IEEE 31st International Conference On Network Protocols (ICNP), pp. 1-6 (Oct. 2023) (Year: 2023).

* cited by examiner

DATA CONFIDENCE FABRICS AND A SIDECAR PROXY

FIELD OF THE INVENTION

Embodiments of the present invention generally relate to data confidence fabrics and data delivery in data confidence fabric networks. More particularly, at least some embodiments of the invention relate to systems, hardware, software, computer-readable media, and methods for deploying a sidecar or proxy configured to connect applications to data confidence fabrics.

BACKGROUND

Computing and other electronic devices come in a variety of types and form factors and have varying capabilities. Many of these devices generate data that may be used by various applications. There is often a question, however, about the value of the data or the confidence that an application can place in the data. In other words, applications benefit from using data in which there is high confidence. Applications that execute using data associated with high confidence levels typically generate more reliable results and outputs.

A data confidence fabric may be configured to apply trust services or trust functions to data. This allows data to be associated with a confidence score, which allows applications or users to gauge the trustworthiness of the data. In order for an application to access a data confidence fabric, however, modification of the source code of the application is required. This leads to lower deployment and adoption rates.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
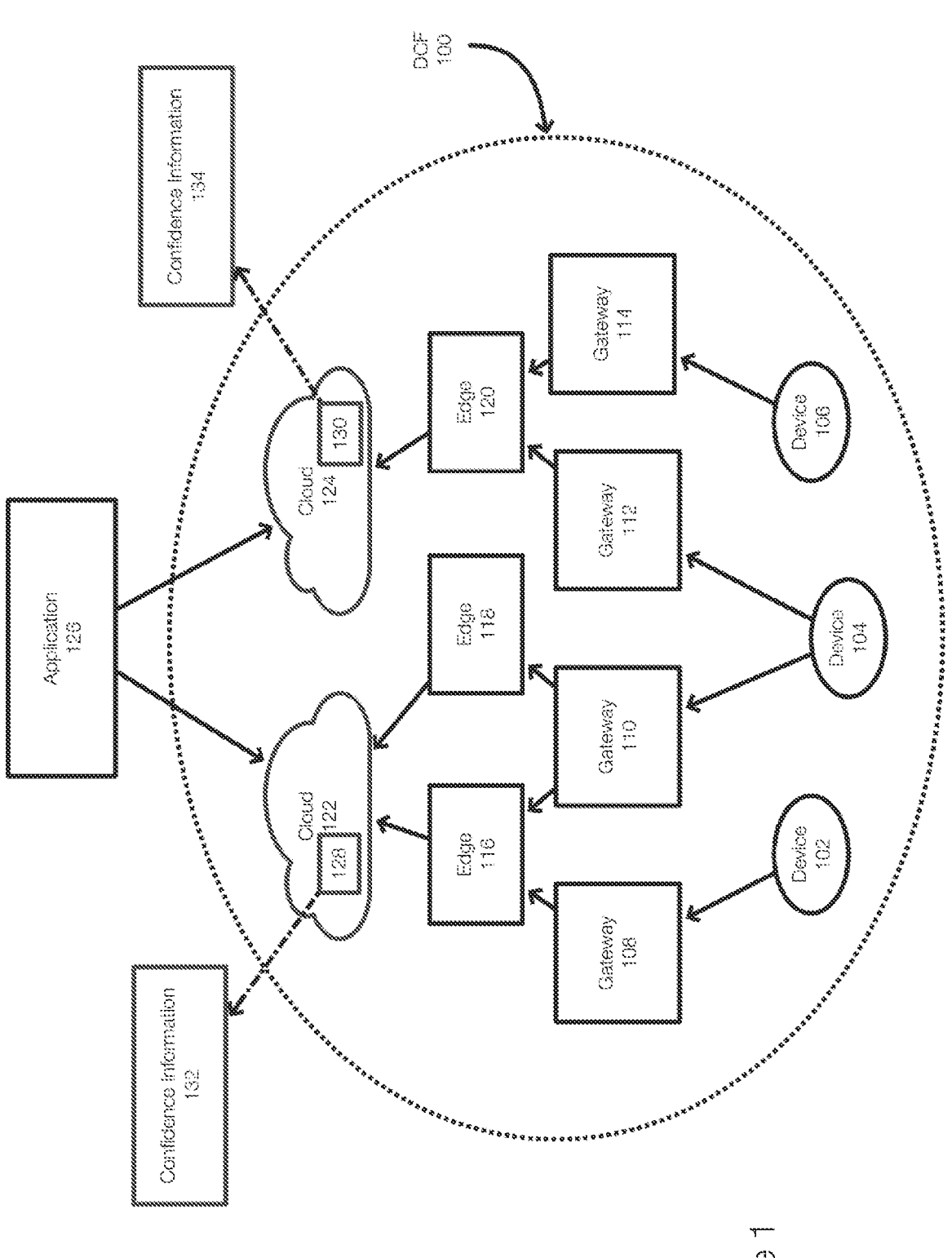
FIG. 1 discloses aspects of a computing system such as a data confidence fabric network.

Embodiments of the present invention generally relate to computing systems or ecosystems such as data confidence fabrics (DCFs). In one example, a DCF is a system or network of hardware (e.g., computers, servers, routers, network interface cards, storage including immutable storage and/or other hardware) that is provisioned (e.g., with software, services) to score or rank data that may be ingested into and/or transmitted through the DCF. Communications in a DCF may include wired (e.g., ethernet) and/or wireless communications. The data ingested into the DCF can be made available to applications, which may also be part of the DCF. A DCF can be implemented in a computing network. The applications can leverage the confidence scores of the data. Data ingested or processed by a DCF may be generated by an application, a device, a data source, or the like. Embodiments of the invention may work in conjunction with devices or systems that are DCF enabled and/or are not DCF enabled.

Embodiments of the invention relate to connecting an application (or data source or other input) with a DCF. Embodiments of the invention enable an application to connect with and benefit from a DCF without having to be reconfigured (e.g., change source code of the application) to be able to consume or interact with the DCF. In one example, a proxy or sidecar is provided that is configured to connect an application to a DCF and the functionality of the DCF. In one embodiment, the sidecar or proxy can intercept communications to/from an application and then have the DCF operate as necessary on the communications or data within the communications.

In some example embodiments, applications or other data sources may generate and/or share data with other applications or users. Trust in this data can be improved by joining or using a DCF that is configured to perform trust functions to or on the data. These trust functions (e.g., trust insertion technologies) may be provided by various providers and may be hardware based and/or software based.

A DCF may include an interface system. Applications may access the interface system using, for example, an API (Application Programming Interface). A DCF is generally configured to add or associate annotations to data. The annotations include confidence information, which can take various forms including a confidence score, trust information, and/or associated trust metadata. The annotations can be added from a hardware perspective and/or a software perspective.

A DCF, by way of example only, may be an architecture and set of services that allow data to be ingested and used by applications. The DCF may include or be associated with trust insertion technologies (hardware and/or software) that are applied to the data as the data flows through the DCF. Each time a trust insertion technology is applied, an annotation may be made in a ledger or other structure and the confidence score of the data may be changed. Thus, the confidence score of data provides a view into the trustworthiness of the data to an application. Data may be associated with an overall confidence score. In addition, a confidence score may be generated for each trust insertion technology. This allows an application, for example, to evaluate how to trust the data in the context of a specific trust insertion technology.

A DCF may include various interconnected hardware environments (e.g., nodes). These nodes may have varying hardware/software capabilities that are examples of trust insertion technologies or hardware-assisted trust insertion technologies. The hardware is configured, such that as data flows from data sources to storage or to applications in a DCF system, scores or confidence information or other annotations can be attached to or associated with the data. As the data is handled by various forms of trust insertion technologies, the overall score or ranking (e.g., a confidence or trustworthiness score) of the data may change. The data scored or ranked in the DCF system may be stored in various locations, such as a data lake, in a datacenter, Public Cloud data storage service, or the like. The annotations, which may include confidence information, a confidence score and/or rank, is made available to one or more applications or other clients or users. The confidence information may include, in addition to a confidence score and/or rank, tables, audit information, and the like.

Confidence scores, which may be determined from hardware aspects and/or software aspects of a DCF, allow an application to explore or exploit the data for potential analysis or consumption. The confidence score or rank of the data allows an application to understand or account for the trustworthiness of the data. For example, the confidence score of the data may have an impact on whether the data is actually used by the application. An application may require a minimum confidence score or have other requirements related to the confidence score.

For example, an application operating in a nuclear facility may need to use data that are very trustworthy (have a high confidence score) while data that are used by an application to control lights in a home may not need to be as trustworthy (a lower confidence score is acceptable). In the context of a nuclear facility, an application may require that the hardware handling the data be firewalled from outside sources, provide hardware assisted encryption, deterministic routing, or the like or combination thereof while data used to control lights may not require these trust services. The trust functions required or desired by an application can be specified and the DCF may perform these trust functions when available.

FIG. 1 illustrates an example of a data confidence fabric network (DCF 100). The DCF 100 includes varies computing and hardware components, connections, and environments. The DCF 100 is configured to add confidence information including confidence scores to data flowing in the DCF 100.

FIG. 1 illustrates examples of data routes or paths in the DCF 100. A specific path of specific data may be referred to as a graph. In FIG. 1, data generated by devices 102, 104, and 106 may flow through multiple levels or multiple hardware environments such as gateways 108, 110, 112, and 114, edges 116, 118, 120, and clouds 122 and 124. In one example, the data may be stored in the clouds 122 and 124.

As the data 128 and the data 130 flow through the DCF 100, the DCF 100 may add annotations (e.g., confidence information) to the data. After flowing through the DCF 100, the data 128 (which may have been generated by one of the devices 102, 104, and/or 106) is stored in the cloud 122 and made available to an application 126. Similarly, the data 130 may be made available to the application 126. Alternatively, the data 128 and 130 are delivered directly to the application 126. The data 128 is associated with confidence information 132 and the data 130 is associated with confidence information 134. The confidence information 132 and 134 may include confidence scores, provenance data, audit trails, data graphs, applied trust insertion technologies or trust functions, or the like. Data flowing through a DCF is typically more valuable and useful at least because the confidence scores or ranks of DCF annotated data allow an application to decide how to trust and/or use the associated data.

Figure 2:
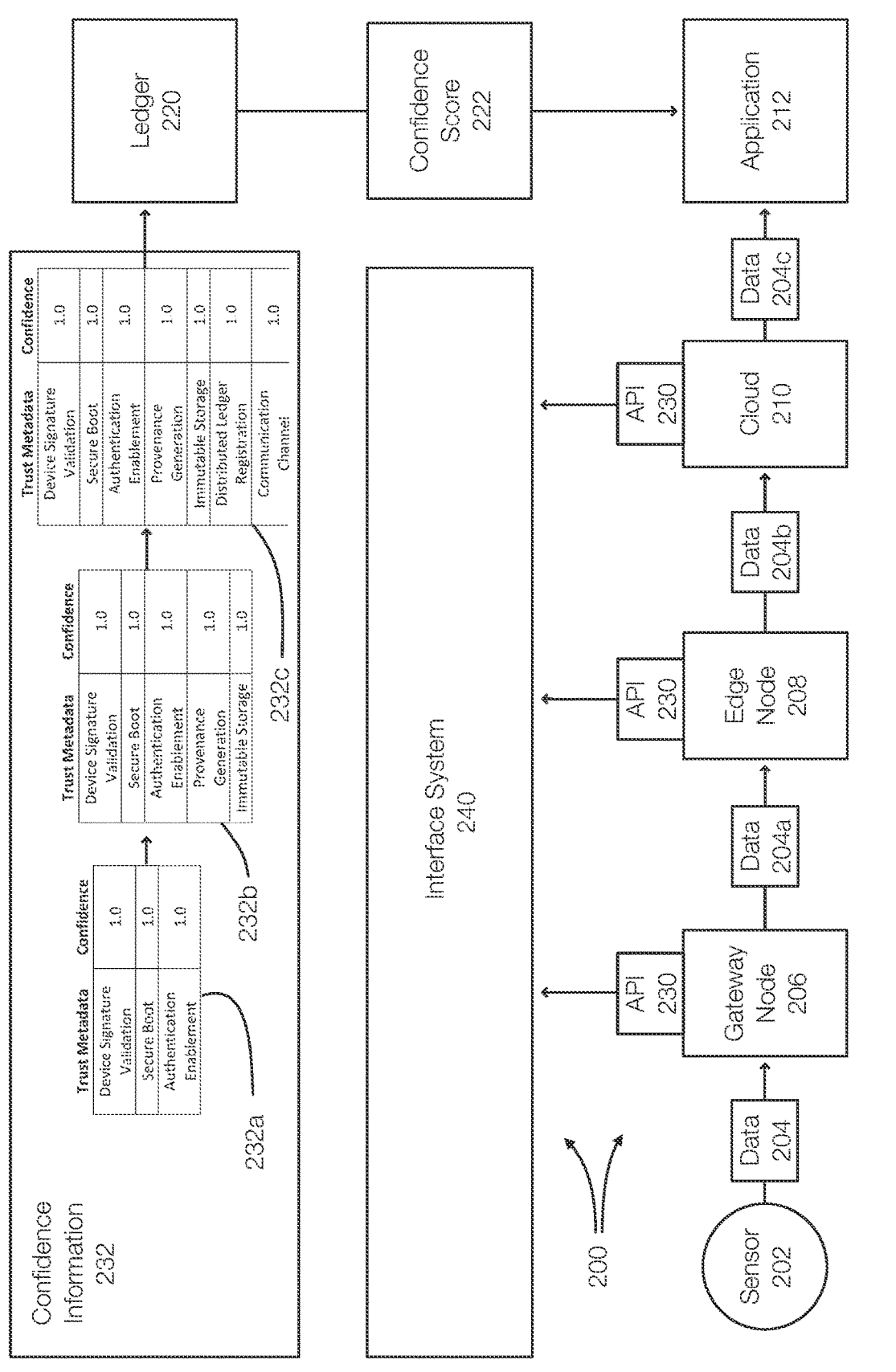
FIG. 2 discloses additional aspects of a computing system such as a data confidence fabric network.

FIG. 2 discloses additional aspects of a data confidence fabric network. FIG. 2 illustrates a DCF 200, which is an example of the DCF 100. In the DCF 200, data 204 is generated by a sensor 202 (or other devices such as user devices) and is ingested into the DCF 200. The data 204 may be received at a gateway node 206, which interfaces with an interface system 240 of the DCF 200 to annotate the data 204 with confidence information.

As illustrated in FIG. 2, confidence information 232 is generated and accompanies the data 204 as the data 204 is routed in the DCF 200. At the gateway node 206, for example, the data 204 is annotated with confidence information 232a, which relates to trust insertion technologies such as a device signature validation, a secure boot, and an authentication enablement. Each of these trust insertion technologies, in this example, are performed and add a score that is reflected in the confidence information 232a. More specifically, the gateway node 206 may access an interface system 240 using an application programming interface (API) 230, which is an example of a DCF driver, to record the confidence information 232a. The data 204 and the annotations or confidence information may be transmitted together or maintained separately. Further, data may be transmitted to a target via the DCF or by the application that generated the data.

Next, the data 204a (which is the annotated data 204 after passing through the gateway node 206) is routed to an edge node 208 and additional confidence information is added as reflected in the confidence information 232b. Thus, the data 204a arrives at the edge node 208 and is already associated with the confidence information 232a. The edge node 208 may add apply additional trust insertion technologies such as provenance generation and immutable storage. These trust insertion technologies allow the confidence information to be augmented as illustrated by the confidence information 232b. Thus, the data 204b leaving the edge node 208 is associated with the confidence information 232b.

Next, the data 204b arrives at the cloud 210 and additional confidence information is added as illustrated by the confidence information 232c. Thus, the cloud 210 may apply or use a trust insertion technology such as distributed ledger registration and the confidence information 232 is updated as shown by the confidence information 232c.

In one example, the confidence information 232 is stored in a ledger 220. As a result, the confidence information 232 is secure and can be accessed by an application 212. In this example, the data 204 arrives at the application 212 as the annotated data 204c, which is associated with the annotations or confidence information 232c and with a confidence score of, in this example, 7.0. In this example, the confidence information 232c includes confidence information related to the communication channel and the associated score of 1.0 may reflect that the selection, performance, and operation of a selected communication channel was as expected and used to deliver the data 204c. The application 212 thus has insight into the trustworthiness of the data 204 generated at the sensor 202 and has insight into the communication channel.

The confidence score can be generated in different ways. The various trust insertion technologies may be weighted or have different scores. For example, the DCF 200 may be associated with a maximum confidence score (e.g., 10). If the data 204 had followed a different route in the DCF 200, the confidence score may be different. For example, other nodes may have trust insertion technologies that could have increased the confidence score of the data 204. Different routes may also result in lower confidence scores.

The ability of an application to join or connect to a data confidence fabric may require the application to be modified. Embodiments of the invention address this problem by providing a proxy or a sidecar. In the context of containers and container orchestration (e.g., Kubernetes), embodiments of the invention relate to a sidecar or a container application that is supported in microservice environments.

Devices, servers, gateways, edge systems, cloud systems) and/or applications in a DCF or that may use a DCF may communicate with one another for various reasons. Data ingested from a sensor, for example, may be received at a gateway from a device and moved to a storage location in the DCF and made available to applications that may or may not be part of the DCF.

Communications in this context, in one embodiment and by way of example only, may be generally described or categorized into four categories: create, transmit, mutate, and publish. These categories are described by way of example and not limitation.

The create category relates to situations where a device or application creates data and transmits the data to other devices within the DCF (or outside the DCF) or within a larger environment. Applications/devices that generate or create data may be viewed as data sources or data originators.

The transmit category relates to devices (or nodes) that receive data and then forward the data to another device or application without modifying the data. In addition, devices that perform transmit communications may consume the data while performing the forwarding operation.

The mutate category relates to communications where a device that receives the data and processes the data. Thus, the device may mutate (e.g., process, change, edit) the data and then forward the changed or mutated data to another device/application. In one example, a lineage operation is performed in various communications such that the old data is linked to the new or mutated data.

The publish category relates to communications where a device may publish the data (e.g., send the data) to a device/application that is not part of the DCF or that is not DCF-enabled. The DCF-enabled application is attesting to the provenance of the data at the time the data is transmitted to the device/application that is not DCF-enabled. These categories may also be viewed as functions.

Embodiments of the invention relate to a sidecar or proxy that is configured to interface with the DCF (e.g., the interface system shown in FIGS. 1 and 2) on behalf of an application. The sidecar may be part of the DCF and may be a DCF configured sidecar. This ensures that the application can be DCF-enabled without modification or access the functionality of the DCF. All trust functions and DCF related operations are handled through or by the sidecar or proxy.

The sidecar is configured to perform the various communication functions and operates in conjunction with an application. The deployment of a sidecar and the operations, including the DCF related operations, performed by the sidecar are substantially transparent to the application. For example, some of the communication functions (e.g., the mutate function) may require assistance from the application, for example, when performing multiple communications in parallel. However, most operations, such as applying trust functions, publishing or writing annotations to the distributed ledger, while maintaining lineage, may be transparent to the application.

Figure 3:
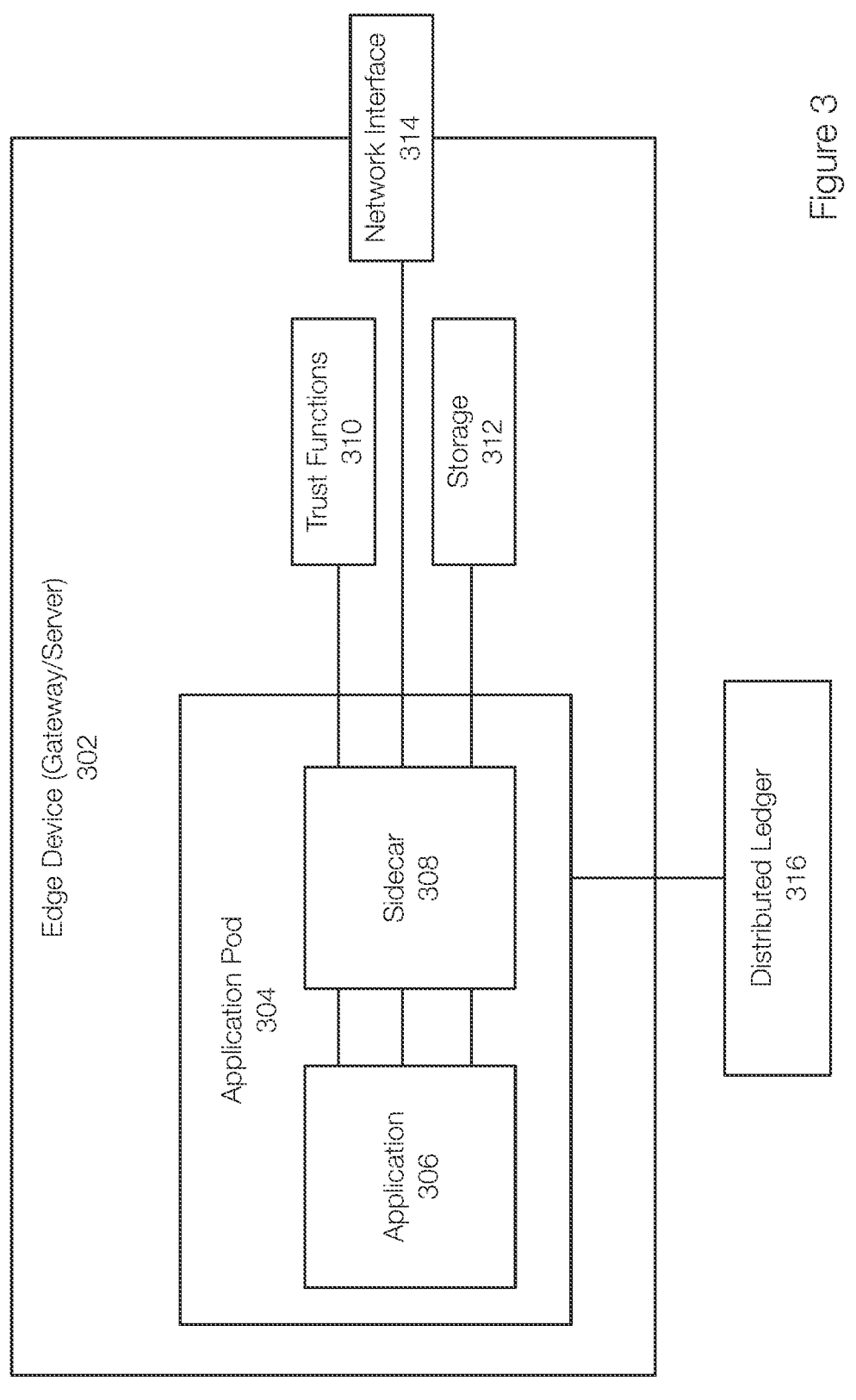
FIG. 3 discloses aspects of deploying aspects of a sidecar configured to connect an application to a data confidence fabric.

FIG. 3 discloses aspects of deploying a sidecar that allows an application to access a data confidence fabric. FIG. 3 illustrates an edge device 302, which may represent a single device or a series of devices such as a gateway and an edge server. In this example, an application pod 304 is running on the edge device 302 (or any node in a DCF) and the pod 304 includes an application 306 (e.g., a container) and a sidecar 308, which may be a microservice, a container, or the like. The edge device 302 may have or be associated with various trust functions 310. The trust functions 310 may include hardware based trust functions such as TPM (Trusted Platform Module) and storage 312 and software based trust functions such as PKI (Publik Key Infrastructure) and TLS (Transport Layer Security).

Thus, the application 306 runs in the pod 304 on an edge device 302. When the pod 304 is deployed, the sidecar 308 may be configured by the application or the application owner or other user. Configuring the sidecar 308 may include identifying a list of trust functions that the application 306 would like applied to its data. Configuring the sidecar 308 may also include providing additional parameters or certificates relevant to certain functions and providing billing details such as a customer wallet.

Once the sidecar 308 is configured, the application 306 (the container) is spawned and the sidecar 308 is spawned to manage at least the data plane of the application 306. The sidecar 308 is configured to perform or access confidence or trust related operations on behalf of the application 306 without direct intervention by the application 306. This ensures that the development, deployment, and tracking maintenance of the application 306 can be provided.

The sidecar 308 may intercept all communications from/ to the application 306, apply or access the trust and storage functions requested by the application 306, perform/access DCF related operations such as writing annotations to the distributed ledger 316, transferring fees to the trust provider or the like, and forward traffic along a path to the intended recipient.

As previously stated, communications may generally fall into one of four categories by way of example only. However, the application 306 is not required to specify the type or category of any given communication as the sidecar 308 can handle all of the communication functions transparently. The sidecar may also be configured to identify the type of communication based on context in one example.

To determine the type of communication, the sidecar 308 may maintain a table with communication events. The table may store hashes of data received/sent by the application 306. The sidecar 308 uses the table and knowledge of past events to determine the communication function type. The table is illustrated in the context of the communication functions, which are described in more detail below. More generally, the hashes and knowledge of past events may be stored in persistent storage that is available to the sidecar 308.

Figure 4:
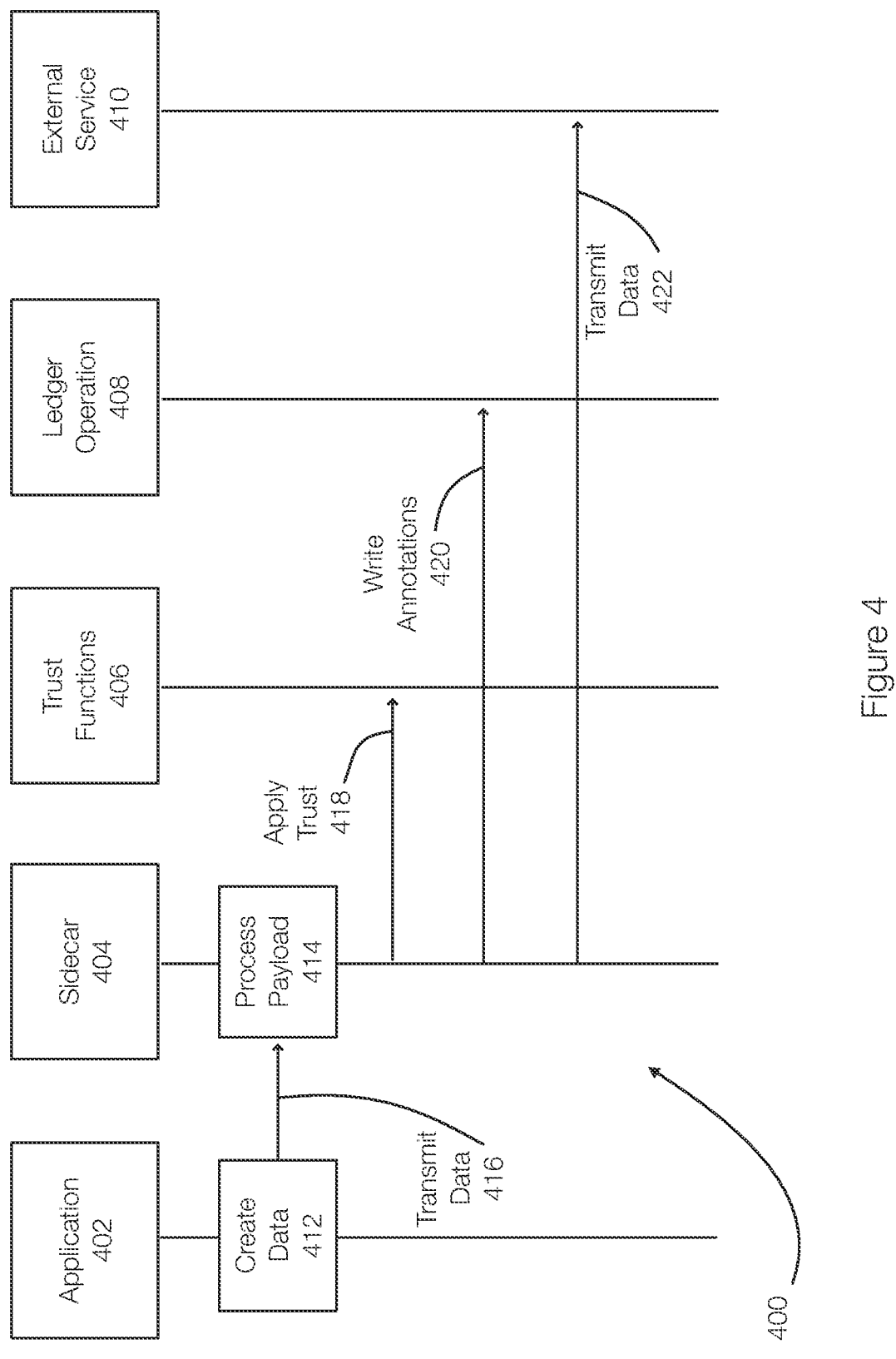
FIG. 4 discloses aspects of a create function and a method of performing the create function.

FIG. 4 discloses aspects of a create function. FIG. 4 also illustrates an example method of performing a create function. In the method 400, an application 402 (or other data source such as a sensor) may create data 412 and the application 402 then transmits a communication 416 that includes the data to a service 410 or other application or target. The data created by an application may be forwarded by other nodes until the data arrives at the destination or target.

The sidecar 404 intercepts the communication 416 and processes the payload 414. Processing the payload 414 or the data in the communication may include, by way of example, determining a hash of the data, identifying trust functions to apply to the data, or the like. If the configuration of the sidecar 404 includes certain trust functions that should be applied to the data, the trust functions 406 are applied 418 by the sidecar 404 in one embodiment. Alternatively, the sidecar 404 may ensure that the trust functions 406 are performed by a trust provider or by the node. Thus, the sidecar 404 accesses the DCF or the trust functions 406 available in the DCF on behalf of the application 402 and ensures that the trust functions are performed.

Once the relevant trust functions 406 have been applied, a ledger operation 408 is performed. This may include writing 420 the data hash and other annotations (e.g., confidence information, trust metadata, confidence scores) to the distributed ledger. The sidecar 404 then transmits 422 the data to the external service 410 or other target originally specified by the application 402. The target may be, in one example, a next node or device in the DCF. The annotations may enable operations or trust functions to be audited.

The method 400 illustrates that the sidecar 404 can be configured to perform or access various DCF operations on behalf of the application 402 without changing the source code of the application 402. Providing a sidecar 404 also ensures that the method 400 is independent of the programming language because the DCF related operations are handled in the sidecar 404, which is separate from the application 402. Thus, the DFC related operations are not performed or accessed directly by the in-process application 402.

Figure 5:
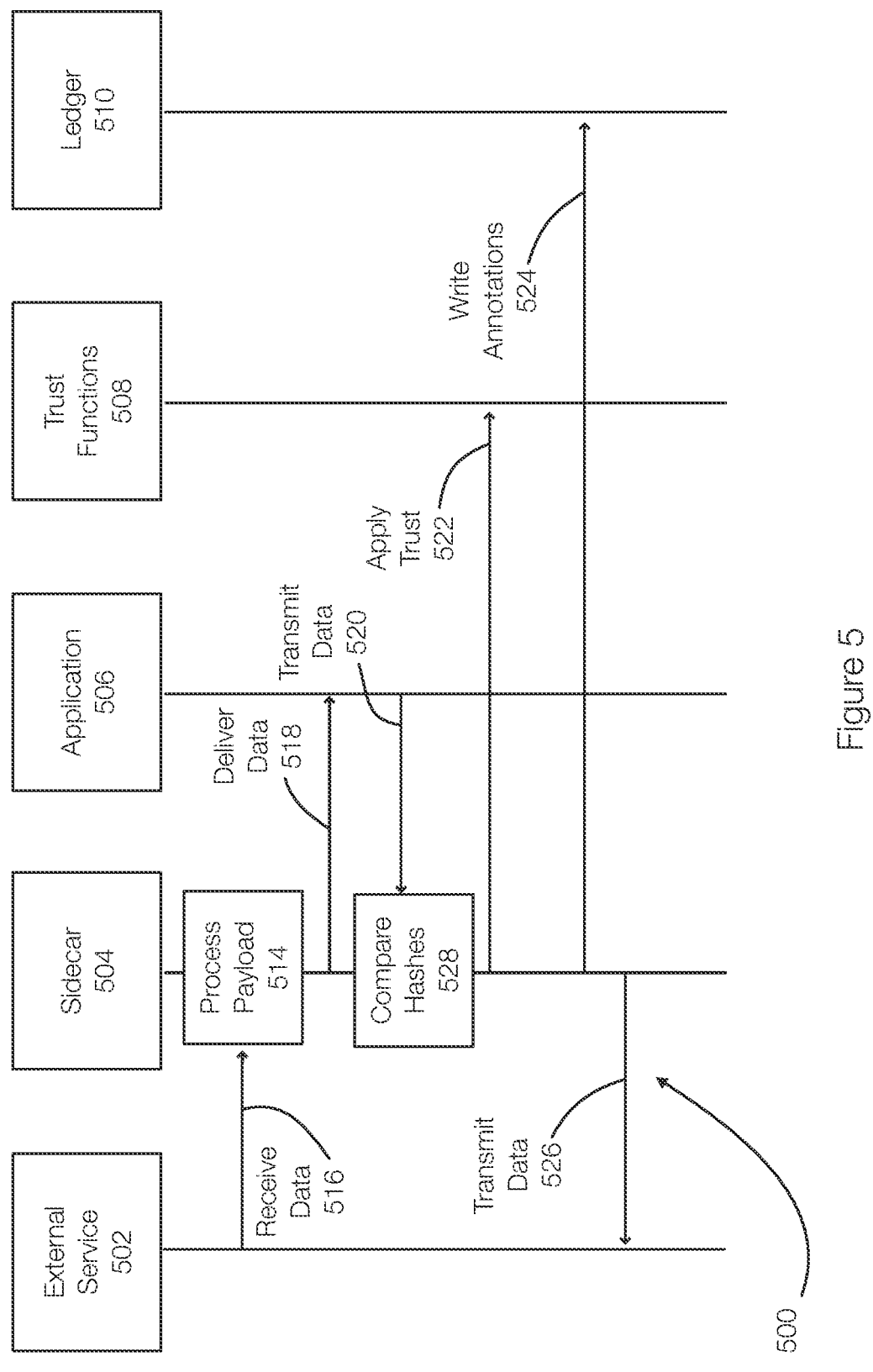
FIG. 5 discloses aspects of a transmit function and a method of performing the transmit function.

FIG. 5 discloses aspects of a transmit function. FIG. 5 also illustrates a method for performing a transmit function in a DCF. In the method 500, a sidecar 504 intercepts or receives 516 a communication that is directed to an application 506 and that includes data from an external service 502 (or data source or other application). In this example, no change is required to communication protocols and the sidecar 504 can receive data (or communications) from the external service 502 regardless of whether the external service 502 is DCF-enabled or not.

Thus, the sidecar 504 receives 516 the communication and processes the payload 514. In general, the sidecar 504 may prepare the payload 514 (or the data) for the application 506. In one example, the trust functions previously applied to the data may be reversed. For example, if the data was encrypted with TLS, the sidecar 504 reverses the encryption. Processing the payload 514 may include storing a hash of the received data. More generally, the sidecar 504 prepares the data for use by the application 506. Once the payload or the data is processed by the sidecar 504, the data is delivered 518 to the application 506.

In this example, the application 506 does not modify the data and may simply transmit the data 520 back to the external service 502 or to another target or to a next node in the path to the target. The sidecar 504 intercepts this communication 520 originating at the application 506. The sidecar 504 then determines the hash of the data in the communication 520 and compares the computed hash with a table (or other representation) of hashes stored in the persistent storage. This may allow the sidecar 504 to determine the type of communication (e.g., the category), determine lineage if necessary, or the like.

In one example, the hashes are compared 528 in the event that it is necessary to determine lineage of the data. More specifically, the hash generated by the sidecar 504 may be compared to a record of hashes such that the data being transmitted 520 can be identified. This allows the lineage of the data to be determined.

The sidecar 504 applies (or accesses) 522 trust functions 508 of the DCF if necessary or if available and writes 524 annotations (e.g., hash, trust metadata, confidence information) to the ledger 510. Finally, the sidecar 504 transmits the data 526 to the specified service 502, application, or target. Advantageously, this allows communications in legacy applications to be processed using the sidecar 504 without changing source code of the application 506.

As data traverses the DCF, some of the trust functions specified by an application to be applied to data may be applied at different nodes. For example, a first sidecar at a first node may apply a portion of the specified trust functions. The sidecar of the next node may apply additional trust functions that were not previously performed.

Figure 6:
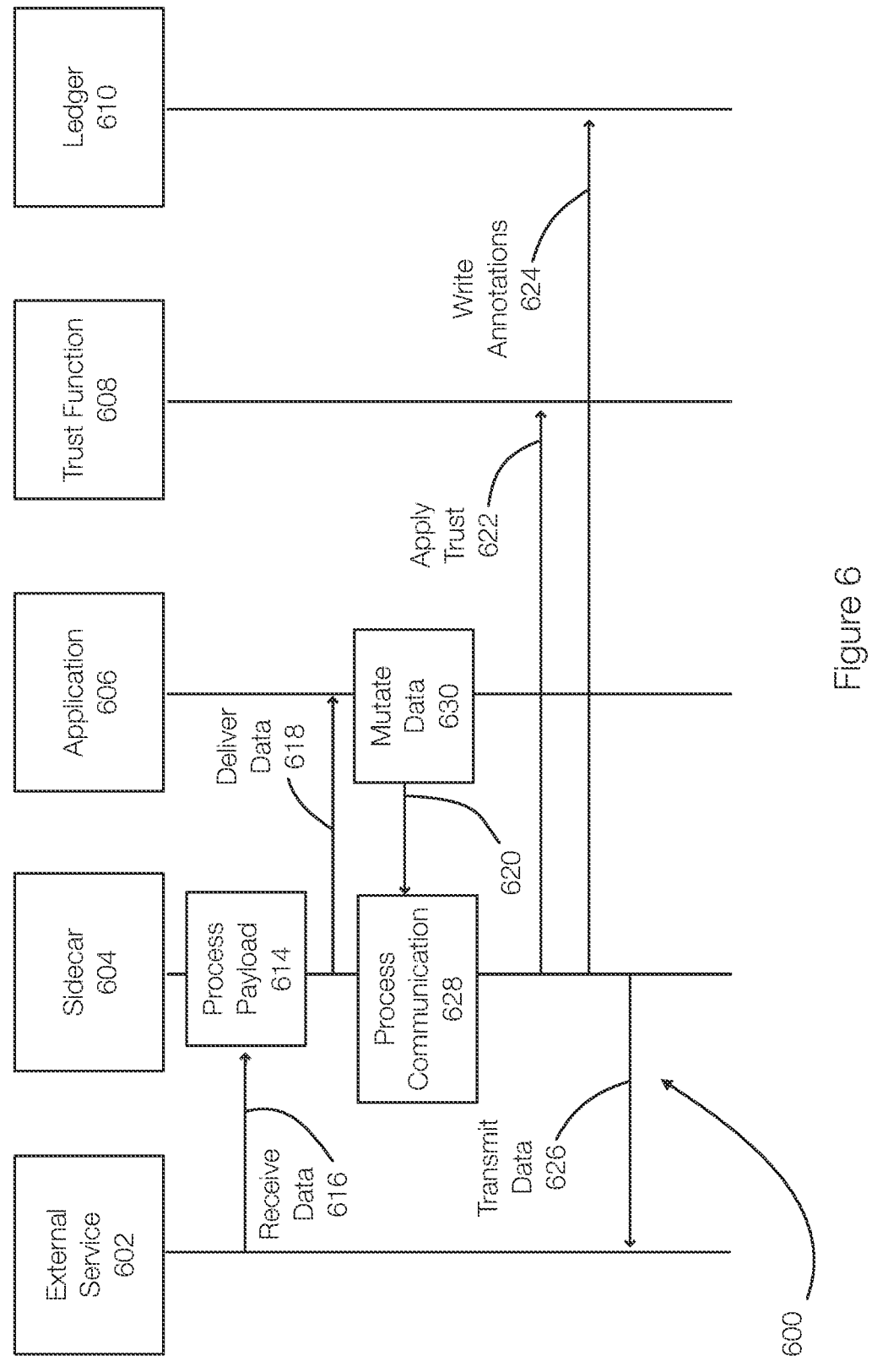
FIG. 6 discloses aspects of a mutate function and a method of performing the mutate function.

FIG. 6 discloses aspects of a mutate function. FIG. 6 also illustrates a method 600 of performing a mutate function. In FIG. 6, data from an external service 602 transmitted to the application 606 is received 616 (or intercepted) at a sidecar 604. The sidecar 604 processes 614 the payload (the data) as previously described. For example, trust functions may be reversed when processing 614 the payload if necessary. Processing 614 the payload may also include generating and storing a hash of the data in persistent storage.

Next, the data is delivered 618 to the application 606 by the sidecar 604. The application 606 may mutate 630 the data. Mutating the data 630 may include changing the data, consuming the data, editing the data, augmenting the data, changing the data type, or the like. In one example, the application 606 may inform the sidecar 604 (or, more generally, the DCF) about which older data relates to the new or mutated data. This allows lineage of the data to be recorded or established. The application 606 can share this type of information by providing hashes of the old data when the mutated data is transmitted.

More specifically, the application 606 may use a predefined message format to share the hash of old data and the hash of the new data that is related to the old data. In one example, to keep embodiments of the invention agnostic, a standard communication protocol, such as HTTP, may be used. For example, the application 606 may post a message (e.g., HTTP POST) to an address that the sidecar 604 is listening to. When the message or communication 628 is received or intercepted by the sidecar 604, the communication is processed 628. This may include generating a hash of the mutated data, establishing lineage using the information from the application 606, or the like.

In the event that the application 606 does not provide lineage information, the sidecar 604 may assume that the data is new and apply the create function to the data.

Next, trust functions 608 are applied 622 and the sidecar 604 writes 624 annotations to the ledger 610. Finally, the sidecar 604 transmits 626 the data to the service 602 or, more generally, to the specified service or target.

A publish function may be called after any one of the create function, the transmit function, and/or the mutate function. For example, an application may receive data from an upstream service (transmit function), modify that data (mutate function), and send the modified data to a non-DCF enabled application (publish function). The publish function is similar to the create function.

Adding or associating a sidecar to an application can be performed in environments that support microservices. Embodiments of the invention allow an application that is not DCF-enabled to be DCF-enabled by adding a sidecar. The manifest file may add the sidecar proxy to the user application and the sidecar will perform or carry out the trust functions, storage functions, and DCF functions.

In one example, many of the nodes in the data confidence fabric may be implemented as or be configured to run containers and each of these containers may be associated with a sidecar. In one example, each of the sidecars may be configured with configuration information. The configuration information, for example, may specify which trust functions to apply for which applications. As data is ingested into the data confidence fabric, each of the sidecars can perform trust functions as necessary based on information associated with the application that originated or created the data using the configuration information. Some of the sidecars in the data path may receive data from a node or device rather than directly from the application. However, each sidecar may perform data confidence related applications based on configuration information associated with the application that created the data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, data protection operations which may include, but are not limited to, payment as a service operations, distributed ledger related operations, publishing operations, data confidence fabric and related operations. More generally, the scope of the invention embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a data-center which is operable to service read, write, delete, backup, restore, and/or cloning operations initiated by one or more clients or other elements of the operating environment.

Example cloud computing environments, which may or may not be public, include storage environments that may provide data protection functionality for one or more clients. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients, applications, or systems, that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

Example embodiments of the invention are applicable to any system capable of storing and handling various types of data of objects, in analog, digital, or other form. Rather, such principles are equally applicable to any object capable of representing information.

It is noted that any operation(s) of any of these methods disclosed herein may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: intercepting data being transmitted across a data confidence fabric at a sidecar, wherein the data was created by an application, processing the data at the sidecar, applying, by the sidecar, at least one trust function to the data, writing annotations associated with the applied at least one trust function to a distributed ledger in the data confidence fabric, and transmitting the data to a target specified by the application.

Embodiment 2. The method of embodiment 1, further comprising determining to perform a create function.

Embodiment 3. The method of embodiment 1 and/or 2, further comprising, by the sidecar, generating a hash of the data, storing the hash to a persistent storage, and identifying trust functions specified by the application, wherein the at least one trust function applied to the data includes the trust functions specified by the application.

Embodiment 4. The method of embodiment 1, 2, and/or 3, further comprising, wherein applying the trust functions, and writing the annotations are transparent to the application.

Embodiment 5. The method of embodiment 1, 2, 3, and/or 4, wherein the application comprises a container and wherein the sidecar comprises a container, wherein one or more nodes in the data confidence fabric are each associated with a different sidecar.

Embodiment 6. The method of embodiment 1, 2, 3, 4, and/or 5, further comprising configuring the sidecar prior to deployment, wherein configuration data includes trust functions to be applied, parameters or certificates relevant to certain trust functions, and/or billing details.

Embodiment 7. The method of embodiment 1, 2, 3, 4, 5, and/or 6, wherein the sidecar is configured to intercept all communications from the application, apply the trust functions and storage functions specified by the application, and forward the data to the target in a manner consistent with a create function.

Embodiment 8. A method comprising: intercepting data sent to an application at a sidecar associated with the application in a data confidence fabric, preparing the data, by the sidecar, for delivery to the application, delivering the data to the application, intercepting the data when subsequently transmitted by the application to a target, applying trust functions specified by the application to the data, writing annotations associated with applying the trust functions to a distributed ledger in the data confidence fabric, and transmitting the data to the target.

Embodiment 9. The method of embodiment 8, further comprising determining to perform a transmit function when a hash of the data received at the sidecar matches a hash of the data transmitted by the application.

Embodiment 10. The method of embodiment 8 and/or 9, further comprising, by the sidecar, generating a hash of the data, storing the hash in a persistent storage, and identifying the trust functions specified by the application.

Embodiment 11. The method of embodiment 8, 9, and/or 10, further comprising determining a lineage of the data using the hash of the data and a table of hashes accessible to the sidecar.

Embodiment 12. The method of embodiment 8, 9, 10, and/or 11, wherein the application comprises a container and wherein the sidecar comprises a container.

Embodiment 13. The method of embodiment 8, 9, 10, 11, and/or 12, further comprising configuring the sidecar prior to deployment, wherein configuration data includes trust functions to be applied, parameters or certificates relevant to certain trust functions, and/or billing details.

Embodiment 14. The method of embodiment 8, 9, 10, 11, 12, and/or 13, wherein the sidecar is configured to intercept all communications from the application, apply the trust functions and storage functions specified by the application, and forwarding the data to the target in a manner consistent with a transmit function.

Embodiment 15. A method comprising: intercepting data sent to an application at a sidecar that is included in a data confidence fabric, reversing trust functions, by the sidecar, that have been applied to the data, calculating a hash of the data and delivering the data to the application, intercepting the data when subsequently transmitted by the application to a target, wherein the data has been mutated, establishing a lineage that links the mutated data to the data, applying trust functions specified by the application to the mutated data, writing annotations associated with applying the trust functions to the mutated data to a distributed ledger in the data confidence fabric, and transmitting the changed data to the target.

Embodiment 16. The method of embodiment 15, further comprising determining to perform a mutate function when receiving a message from the application that includes a hash of the data and a hash of the mutated data.

Embodiment 17. The method of embodiment 15 and/or 16, further comprising, by the sidecar, generating a hash of the data, storing the hash in a persistent storage, and identifying the trust functions specified by the application and generating a hash of the mutated data and storing the hash of the mutated data in the table.

Embodiment 18. The method of embodiment 15, 16, and/or 17, further comprising performing a publish function to send the mutated data to an enabled or non-enabled DCF application.

Embodiment 19. The method of embodiment 15, 16, 17, and/or 18, wherein the application comprises a container and wherein the sidecar comprises a container.

Embodiment 20. The method of embodiment 15, 16, 17, 18, and/or 19, further comprising configuring the sidecar prior to deployment, wherein configuration data includes trust functions to be applied, parameters or certificates relevant to certain trust functions, and/or billing details.

Embodiment 21. A system, comprising hardware and/or software, operable to perform any of the operations, methods, or processes, or any portion of any of these, or any combination thereof disclosed herein.

Embodiment 22. A method operable to perform any of the operations, methods, or processes, or any portion of any of these, or any combination thereof disclosed herein.

Embodiment 23. A non-transitory storage medium having stored therein instructions that are executable by one or more hardware processors to perform operations comprising the operations of any one or more of embodiments 1-20.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, service, or client may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
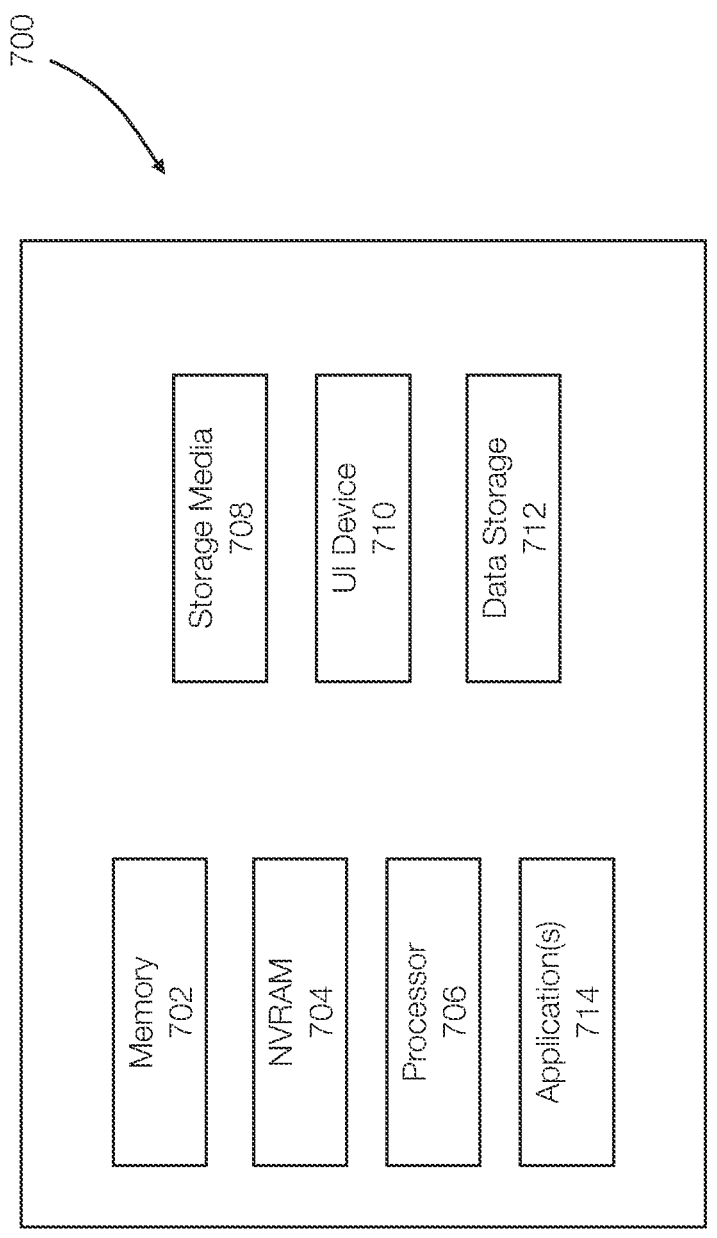
FIG. 7 discloses aspects of a computing device, system, or entity.

With reference briefly now to FIG. 7, any one or more of the entities disclosed, or implied, by the Figures, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   intercepting data being transmitted across a data confidence fabric at a sidecar, wherein the data was created by an application;
   processing the data at the sidecar, including generating confidence information about the data, the confidence information including trust metadata and an associated confidence score, generating a hash of the data, storing the hash to a persistent storage, and identifying trust functions specified by the application;
   annotating the data with the confidence information;
   applying, by the sidecar, at least one trust function to the data, wherein the at least one trust function applied to the data includes the trust functions specified by the application;
   writing annotations associated with the applied at least one trust function to a distributed ledger in the data confidence fabric; and
   transmitting the annotated data to a target specified by the application.

2. The method of claim 1, further comprising determining to perform a create function.

3. The method of claim 1, wherein applying the trust functions, and writing the annotations are transparent to the application.

4. The method of claim 1, wherein the application comprises a first container and wherein the sidecar comprises a second container, wherein one or more nodes in the data confidence fabric are each associated with a different sidecar.

5. The method of claim 1, further comprising configuring the sidecar prior to deployment, wherein configuration data includes trust functions to be applied, parameters or certificates relevant to certain trust functions, and/or billing details.

6. The method of claim 1, wherein the sidecar is configured to intercept all communications from the application, apply the at least one trust function and storage functions specified by the application, and forward the data to the target according a create function.

7. The method of claim 1, further comprising determining a lineage of the data using the hash of the data and a table of hashes accessible to the sidecar.

8. The method of claim 1, further comprising reversing trust functions, by the sidecar, that have been applied to the data.

9. The method of claim 1, further comprising performing a publish function to send the data to an enabled or non-enabled DCF application.

\* \* \* \* \*